(12) United States Patent
Bhattacharjee et al.

(10) Patent No.: US 11,444,648 B2
(45) Date of Patent: Sep. 13, 2022

(54) MOBILE RF RADIATION DETECTION DEVICE

(71) Applicant: INDIAN INSTITUTE OF TECHNOLOGY, Guwahati (IN)

(72) Inventors: Mitradip Bhattacharjee, Guwahati (IN); Dipankar Bandyopadhyay, Guwahati (IN)

(73) Assignee: INDIAN INSTITUTE OF TECHNOLOGY, GUWAHATI, Guwahati (IN)

( * ) Notice: Subject to any disclaimer, the term of this patent is extended or adjusted under 35 U.S.C. 154(b) by 324 days.

(21) Appl. No.: 16/757,041

(22) PCT Filed: Oct. 15, 2018

(86) PCT No.: PCT/IN2018/050661
§ 371 (c)(1),
(2) Date: Apr. 17, 2020

(87) PCT Pub. No.: WO2019/077624
PCT Pub. Date: Apr. 25, 2019

(65) Prior Publication Data
US 2020/0336164 A1    Oct. 22, 2020

(30) Foreign Application Priority Data
Oct. 20, 2017   (IN) .............................. 201731037221

(51) Int. Cl.
*H04B 1/3827* (2015.01)
*H01Q 5/22* (2015.01)
(Continued)

(52) U.S. Cl.
CPC ............. *H04B 1/3833* (2013.01); *H01B 1/22* (2013.01); *H01Q 5/22* (2015.01); *H04B 1/3816* (2013.01)

(58) Field of Classification Search
CPC ........... H04B 1/3833; H01B 1/22; H01Q 5/22
See application file for complete search history.

(56) References Cited

U.S. PATENT DOCUMENTS 6,529,710 B1 * 3/2003 Lindemann .......... H03G 3/3042
                                                           455/75
10,671,994 B2 * 6/2020 Wan ..................... G06Q 20/204
(Continued)

*Primary Examiner* — Zhiren Qin
(74) *Attorney, Agent, or Firm* — Pearl Cohen Zedek Latzer Baratz LLP

(57) ABSTRACT

The present invention relates to a portable, affordable and user-friendly mobile RF radiation detection device. The device is composed of three major parts, namely, a sensor arrangement, a processing 5 unit, and a power supply. The sensor arrangement consists of a flexible sensor and an associated circuit element having few passive electrical components. The substrate of the sensor was made of nanoparticle treated flexible material preferably paper treated with the gold nanoparticles (AuNPs). The electrically conducting patches made 10 of conductive materials preferably silver pastes on the substrate are the key component in detecting the RF radiation from the mobile. The electrical signal generated by the RF sensor is sent to the processing unit, which further transmitted the signal to a mobile android application for displaying the result. The device is useful for detecting 15 harmful mobile radiations to generate alarm in order to save people from deadly diseases such as cell or tissue denaturation, depression, tumor formation, and above all malignancy of tumors.

8 Claims, 3 Drawing Sheets

Figure 1:
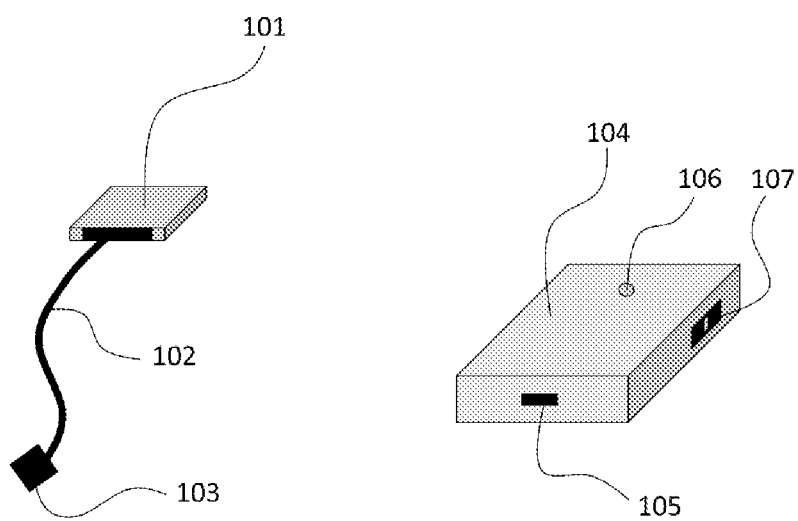

(51) Int. Cl.
*H01B 1/22* (2006.01)
*H04B 1/3816* (2015.01)

(56) References Cited

U.S. PATENT DOCUMENTS

| | | | | |
|---|---|---|---|---|
| 2004/0158604 | A1* | 8/2004 | Hepworth | H04L 67/327 |
| | | | | 709/200 |
| 2004/0159708 | A1* | 8/2004 | Yogev | G06K 19/067 |
| | | | | 235/492 |
| 2009/0121147 | A1* | 5/2009 | Kahlman | G01N 27/3275 |
| | | | | 250/336.1 |
| 2010/0321162 | A1* | 12/2010 | Burd | G01S 13/753 |
| | | | | 340/10.1 |
| 2012/0021443 | A1* | 1/2012 | Geddes | G01N 33/54373 |
| | | | | 435/7.92 |
| 2012/0279762 | A1* | 11/2012 | Hur | B82Y 40/00 |
| | | | | 977/932 |
| 2013/0303092 | A1* | 11/2013 | Penafiel | H04M 1/0202 |
| | | | | 455/73 |
| 2015/0379320 | A1* | 12/2015 | Slowik | G06K 7/1095 |
| | | | | 235/455 |
| 2017/0063417 | A1* | 3/2017 | Butner | H04W 24/08 |

* cited by examiner

MOBILE RF RADIATION DETECTION DEVICE

CROSS-REFERENCE TO RELATED APPLICATIONS

This application is a National Phase Application of PCT International Application No. PCT/IN2018/050661, International Filing Date Oct. 15, 2018, claiming priority of Indian Patent Application No. 201731037221 filed Oct. 20, 2017, which is hereby incorporated by reference.

FIELD OF THE INVENTION

The present invention relates to a mobile RF radiation detection device. More particularly, the present invention is directed to an economic, portable and user-friendly point-of-care-testing (POCT) device, which can detect the mobile radiation issuing out from the handset and can pass on the information to the user once it is near the level of alarm. The device consists of three different parts namely, a sensor arrangement, a processing unit, and a power supply. The sensor is composed of conductive patches on a flexible substrate preferably of paper treated with nanoparticles preferably gold nanoparticles (AuNPs). This innovation can prevent the risk of mobile radiation, which is capable of causing irreversible health hazards.

BACKGROUND OF THE INVENTION

Mobile radiation has turned out to be an enormous health risk in modern life. The radiation from the mobile may cause various deadly diseases such as cell or tissue denaturation, depression, tumor formation, and above all malignancy of tumors. Hence there is a need of an economical and portable point-of-care-testing (POCT) device, which can detect the radiation level of a mobile phone in the immediate vicinity of a human being.

In the age of this hi-tech era, the mobile and wireless communication has become an integral part of human life. The society is now connected wirelessly through the mobile phone networks from urban to sub-urban areas. It is also extended to the remote rural areas across the globe and enables users to make instant communication with friends, family, and colleagues. The mobile communication is based on the transmission of radio frequencies (RF) [U.S. Pat. No. 3,663,762A, WO2000076247A1]. Typically, the frequency band involved in this global system of mobile (GSM) communication is around 850 MHz to 3 GHz [US20040224666A1, U.S. Pat. Nos. 5,978,679A, 7,596, 149B2]. All the active mobile or wireless devices transmit or radiate RF signal in order to set up a communication pathway [U.S. Pat. No. 7,103,511 B2, U.S. Pat. No. 9,225, 555 B2]. Prior reports have shown that the radiations from the mobile phone causes many serious health problems if the radiation frequency goes beyond a critical level [Kesari K. K. et. al. Indian J. Exp. Biol. 2013; 51 (3): p. 187-200]. The extent of radiation from a mobile device is in general measured scientifically by evaluating a coefficient commonly known as the specific absorption rate (SAR). The magnitude of SAR helps in evaluating the absorption of mobile radiation power by the tissues inside human body [WO2014064553A1, U.S. Pat. No. 9,547,063B2, U.S. Pat. No. 9,559,415B2, U.S. Pat. No. 8,710,851B2]. Our present innovation is related to the detection of the extent of radiation from a mobile device.

In this regard, it may be noted here that there are a lot of wireless devices that needs a transmitter and a receiver of particular frequency for setting up a communication [US20150270618A1, U.S. Pat. No. 9,559,425B2, US20130328723A1, US20110157019A1, US20100283692A1, U.S. Pat. No. 9,379,445, US20080165065A1, US20050057399A1, US20040227678A1, U.S. Pat. Nos. 8,055,207, 7,277,686, 7,088,299]. The transmitters and receivers of those radio frequencies act as the interfaces in the communication pathways. Every mobile device also has these interfaces commonly known as the antenna, which receives the RF to set-up a communication pathway. There are different types of built-in RF receivers such as energy diversity antenna, [U.S. Pat. No. 5,760,747] dual band RF detector, [U.S. Pat. No. 5,884,149] Ethernet enabled RF antenna, [U.S. Pat. No. 5,936,240] radio frequency identification tag, [U.S. Pat. No. 6,107,920] coupled directional RF receiver, [U.S. Pat. No. 6,456,856] that help in receiving the RF frequencies. Since the mobile phones generally work in the RF range, they receive as well as radiate RF signal. Apart from the mobile phones, the mobile towers that setup the mobile network also transmit and receive the RF signals in order to set the communication pathway. However, the radiation from mobile phones are bigger threats to the health of the user because the hand-set stays near the body.

It may also be noted that the recent reports suggest that the radiation from the mobile tower and mobile device actually hampering the eco-system, bio-diversity, and human health of a particular geographic location [Kesari K. K. et. al. Indian J. Exp. Biol. 2013; 51 (3): p. 187-200]. The bio-diversity and natural resources of an urban location has changed a lot due to presence of the communication towers. Moreover, excessive use of the mobile phone has caused serious health hazards to the users, which has enforced the use of different types of RF shields in the recent years [refer to, WO2015023308A1, U.S. Pat. No. 8,270,929B1]. According to studies, a long period exposure of RF radiation penetrates the tissue and cells to cause deadly diseases like cell or tissue denaturation, depression, tumor formation, and above all malignancy of tumors. [D. Leszczynski et. al. *Differentiation* (2002) 70, 120-129; G. M. J. Van Leeuwen et. al. *Phys. Med. Biol.* (1999) 44, 2367-2379; D. Weisbrot et. al. *J. Cellular Biochem.* (2003) 89, 48-55] Hence, the RF radiation level of a mobile phone is a very important factor to measure in real time to prevent unwanted exposure of such radiation to a human body.

Thus, there has been an immediate need of a device, which can detect the RF radiations of the mobile at the location of the user site to limit the health hazards associated with the same. The RF radiation of the mobile varies during a call and even during the standby mode. A very less access of mobile network generally consumes more power to set-up a faithful connection. Thus, in a low network zone, the mobile phone radiates more which may escalate the health issues associated with the same. In this direction, there is a need of a portable and economic POCT device, which can detect the mobile radiation and can warn the user for a high radiation level immediately upon exposure. In view of the above, the present advancement is directed to provide an economical, portable and user friendly proof-of-concept device composed of an RF sensor has been developed, which can detect the RF radiation level of the surroundings before displaying the same on a mobile interface.

OBJECT OF THE INVENTION

The basic object of the present invention is directed to provide an economic, user-friendly, and portable point-ofcare-testing (POCT) device for mobile RF radiation detection which can detect the mobile radiation issuing out from the handset and can pass on the information to the user once it is near the level of alarm.

A further object of the present invention is directed to provide said point-of-care-testing (POCT) device for mobile RF radiation detection which is simple in construction being composed of RF sensor, a processing unit, and a power supply.

A still further object of the present invention is directed to provide said point-of-care-testing (POCT) device for mobile RF radiation detection wherein the RF sensor is flexible and replaceable, made of flexible substrate preferably commercial filter paper with conductive patch of a conductive material, preferably silver paste.

A still further object of the present invention is directed to provide said point-of-care-testing (POCT) device for mobile RF radiation detection wherein the flexible substrate is pre-treated with electrically conducting nanoparticles, preferably AuNPs for reducing the defects of the conductive patches and enhance the conductance for efficient reception of RF radiation.

A still further object of the present invention is directed to provide said point-of-care-testing (POCT) device for mobile RF radiation detection wherein the sensor also consists of some passive components like signal diode and capacitor in order to enable it to generate detectable signals.

Another object of the present invention is directed to provide said point-of-care-testing (POCT) device for mobile RF radiation detection wherein the RF radiation from the mobile interacts with the paper RF sensor to produce a signal, which can be detected with the processing unit.

Yet another object of the present invention is directed to provide said point-of-care-testing (POCT) device for mobile RF radiation detection wherein the device is highly sensitive, portable, user-friendly, and can guide the user to measure the mobile radiation level.

Yet another object of the present invention is directed to provide said point-of-care-testing (POCT) device for mobile RF radiation detection wherein the device is capable of making wireless connection to the user mobile to enable proficient in the data transfer of the mobile radiation level and display the data on the mobile interface with the help of an android application.

SUMMARY OF THE INVENTION

Thus according to a basic aspect of the present invention, the same is directed to a flexible sensor for mobile RF radiation comprising:

flexible substrate treated with conductive nanoparticles and including conductive patches adapted for detection of RF radiation and generation of voltage signal based thereon.

A further aspect of the present invention is directed to said flexible sensor for mobile RF radiation comprising paper based flexible substrate with conductive nanoparticles preferably gold nanoparticles and said conductive patches comprising silver paste.

A further aspect of the present invention is directed to a mobile RF radiation detection device comprising:

at least one flexible sensor unit for mobile RF radiation for detection and generation of corresponding voltage signal;

processing unit operatively connecting to said flexible sensor for indication of mobile detection level; and cooperative power source.

Another aspect of the present invention is directed to said mobile RF radiation detection device wherein said flexible sensor comprises flexible and replaceable substrate preferably paper based with conductive nanoparticles preferably gold nanoparticles and said conductive patches comprises silver paste.

Yet another aspect of the present invention is directed to said mobile RF radiation detection device wherein said processing unit connects the flexible sensor to an android application for display of mobile radiation level based on said variation in the generated voltage; and wherein the power source is connected to the sensor circuit.

A further aspect of the present invention is directed to said mobile RF radiation detection device wherein said sensor unit comprises:

said flexible sensor and multiple passive electronic operatives adapted to detecting the signal;

said sensor connected to an amplifier which amplifies the received signal and then transmit it to a processing unit;

said sensor unit is further connected to a processing or measuring unit.

A still further aspect of the present invention is directed to said mobile RF radiation detection device comprising:

said flexible sensor comprising of nanoparticle treated flexible substrate preferably gold nanoparticle treated paper substrate.

said flexible sensor having conductive patches preferably made of silver paste on the substrate.

said patch dimensions selected based on the frequency range of the RF.

A still further aspect of the present invention is directed to said mobile RF radiation detection device wherein said signal processing unit is integrated with a power source and processing unit comprises circuitry operatively connected to a power source unit.

said signal processing unit adapted to receive an analog electrical signal corresponding to the mobile radiation from the sensor unit and convert it to a digital signal and transmit wirelessly to the mobile phone such that the sensor output undergo a real-time display on an android application on the mobile.

Another aspect of the present invention is directed to said mobile RF radiation detection device comprising wireless connectivity and the mobile application whereby mobile radiation can be monitored on the mobile display for longer duration and the data associated with the same can be stored for future analysis.

Yet another aspect of the present invention is directed to said mobile RF radiation detection device wherein said power source comprises integrated battery integrated which supplies power to the sensor unit and the signal processing unit.

The above and other objects and advantages of the present invention are described hereunder in greater details with reference to the following accompanying non-limiting illustrative drawings.

BRIEF DESCRIPTION OF THE ACCOMPANYING DRAWINGS

FIG. 1: shows isometric view of the mobile RF radiation detection device according to present invention.

Figure 2:
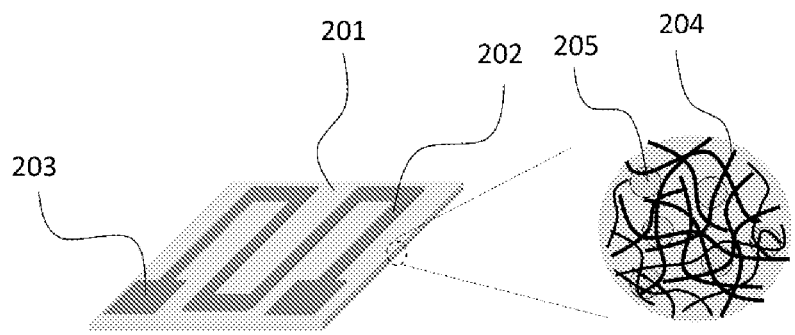

FIG. 2: shows the sensor arrangement.

Figure 3:
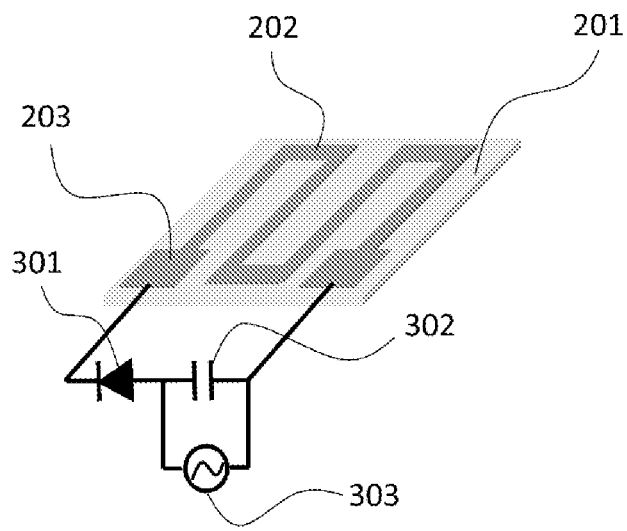

FIG. 3: shows the associated components of the sensor.

Figure 4:
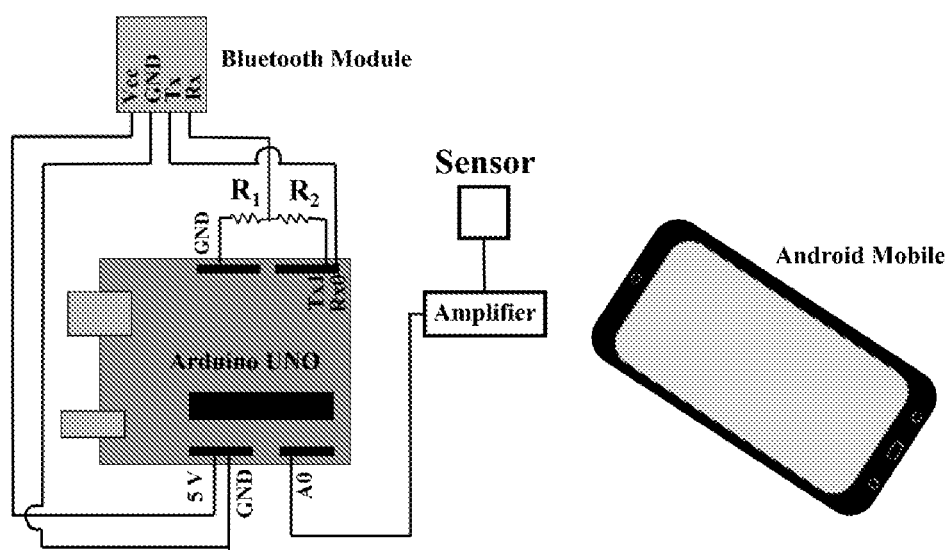

FIG. 4: shows the associated circuit of processing unit.

Figure 5:
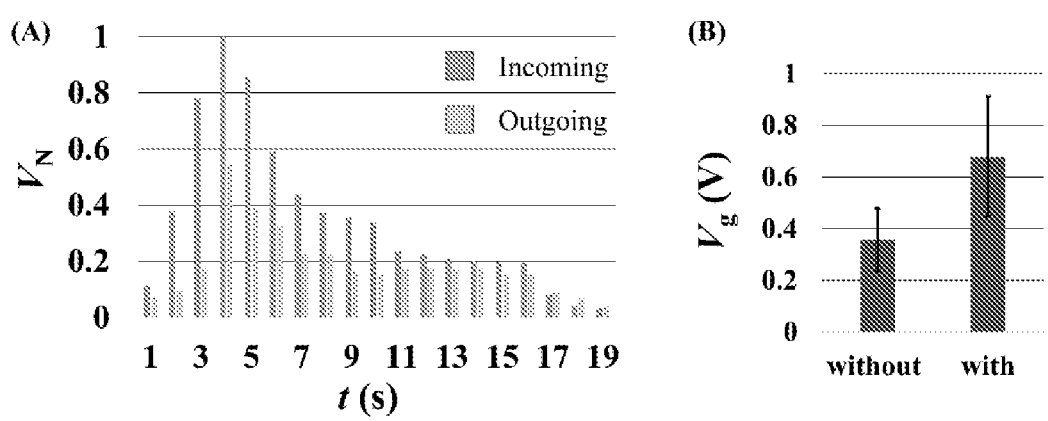

FIG. 5: shows the response of the sensor.

DETAILED DESCRIPTION OF THE INVENTION WITH REFERENCE TO THE ACCOMPANYING DRAWINGS

This invention is a portable mobile radiation detection device. The radiation of wireless connections, especially radiations associated with mobile communications are intensely effecting the lives and health of people of this generation. Recent studies have indicated that the radiations from mobile phones are causing a lot of health hazards as discussed previously. To overcome this problem, we need to know the radiation levels from a mobile phone. The present invention targets this very area and is capable of showing the radiation level emitted from a mobile phone. The device consists of three major parts, namely, a sensor arrangement, a processing unit, and a power supply. The sensor arrangement consists of a flexible RF radiation sensor is combined with some passive components. The processing unit receives the signal from the sensor and sends to an android mobile application after necessary processing. Power supply unit provides the required power to the device to work properly. The device is economical, portable and user-friendly.

The present invention is described in details herein below with reference to the accompanying drawings that represent a preferred embodiment of this invention.

Accompanying FIG. 1 shows the isometric view of the mobile RF radiation detection device according to present invention illustrating different parts of the device where the number 101 refers to outer cabinet of the sensor. The flexible sensor is placed inside the mentioned cabinet. The sensor detects the RF radiation once the user brings it near a radiating object say an active mobile phone while in operation. The components 102 and 103 refers to connecting wire and the connector which connects the sensor with the processing unit 104 using the socket 105. The processing unit contains an indicator LED 106 and an ON-OFF switch 107.

Accompanying FIGS. 2 and 3 show the details of sensor arrangement of the device according to the present invention. The sensor arrangement also has two different parts, (i) the flexible sensor and (ii) the passive components associated to the sensor. The sensor is elaborately discussed in FIG. 2. The number 201 and 202 refer to the flexible substrate preferably paper and a coating of conductive material preferably of silver paste, respectively. The number 203 refers to the connector pad of the sensor that connects the sensor with the connecting wire 102. This figure also shows a magnified view of the paper substrate where the number 204 refers to the cellulose fiber of the paper substrate. The number 205 refers to the gold nanoparticle (AuNP) embedded inside the paper substrate. The component 201 is the nanoparticle treated flexible substrate preferably AuNP treated filter paper. A conductive patch on the substrate 202 works as the detection element. The patch is made of a conductive material preferably silver paste. The patch has two connecting pads 203 which helps in make connection with the required external components.

The external passive components associated with the sensor are shown in accompanying FIG. 3. The number 301 and 302 show a signal diode and a capacitor in series connection, respectively. The RF radiation interacts with the flexible receiver or antenna fabricated on the paper and induces an oscillating electric current. The length of the antenna generally determines the range of frequency that can be detected by the antenna. The length of the receiver can be derived from the expression, $c=f\lambda$ for a full-wave antenna where c is the velocity of the EM wave, f is frequency and $\lambda$ is the wave-length of the wave and a full-wave antenna length should be similar to the wave length of the propagating wave. The integration of nanoparticles helps in reducing the defects in the conductive patches and make them more conductive which in turn enables a receiver to receive the RF more efficiently. The component 303 is the processing or measuring component of the sensor output.

Accompanying FIG. 4 shows the processing unit 303 of the device.

The circuit diagram consists of an open source development board, Arduino UNO, a commercial Bluetooth module (HC-06/05), and electrical passive components. The symbols $R_1$ and $R_2$ are the resistors with fixed resistance value which were calibrated according to the sensor response. The sensor is connected to an amplifier which amplifies the received signal and then transmit it to the analog input pin A0 of the Arduino UNO. The signal is then transmitted by the Bluetooth module and is further received by the android mobile application which displays it on the mobile screen.

Accompanying FIG. 5 shows the response of the sensor due to mobile radiation. Images (A) shows the mobile radiation with time in case of incoming and outgoing calls. Image (B) shows the response of the sensor with and without nanoparticles for an incoming call. Here, $V_N$ refers to the normalized voltage signal of the sensor and $V_g$ is the generated voltage in presence of RF signal.

It is thus possible by way of the present invention to provide an economic and user-friendly point-of-care-testing (POCT) device for mobile RF radiation detection which can detect the mobile radiation issuing out from the handset and can pass on the information to the user once it is near the level of alarm. The device comprises three different parts namely, a sensor arrangement, a processing unit, and a power supply that cooperatively detect the RF radiation level of a mobile in the vicinity of a user in a reliable manner. The sensor is composed of a conductive patches on a flexible substrate preferably of paper treated with nanoparticles preferably gold nanoparticles (AuNPs). This innovation can prevent the risk of mobile radiation, which is capable of causing irreversible health hazards.

We claim:

1. A Flexible sensor for mobile Radio Frequency (RF) radiation comprising:
   a flexible substrate treated with conductive nanoparticles and including conductive patches adapted for detection of RF radiation and generation of voltage signal based thereon; and
   a paper based flexible substrate with conductive nanoparticles are gold nanoparticles and said conductive patches comprising silver paste.

2. A Mobile Radio Frequency (RF) radiation detection device comprising:
   at least one flexible sensor for mobile RF radiation for detection and generation of corresponding voltage signal;
   a processing unit operatively connecting to said flexible sensor for indication of mobile detection level; and
   a cooperative power source; and
   wherein said flexible sensor comprises flexible and replaceable substrate is paper based with conductive nanoparticles are gold nanoparticles and conductive patches comprising silver paste.

3. The Mobile RF radiation detection device as claimed in claim 2, wherein said processing unit connects the flexible sensor to an android application for display of mobile radiation level based on variation in the generated voltage signal; and wherein the cooperative power source is connected to the flexible sensor.

4. The Mobile RF radiation detection device as claimed in claim 2, wherein said flexible sensor is:
   coupled to multiple passive electronic operatives adapted to detecting RF signal;
   connected to an amplifier which amplifies the detected RF signal and then transmit it to the processing unit; and
   further connected to the processing unit or a measuring unit.

5. The Mobile RF radiation detection device as claimed in claim 2, comprising:
   dimensions of said patch are selected based on frequency range of the RF.

6. The Mobile RF radiation detection device as claimed in claim 2, wherein said processing unit comprises circuitry operatively connected to the power source;
   said processing unit adapted to receive an analog electrical signal corresponding to mobile radiation from the flexible sensor and convert it to a digital signal and transmit wirelessly to a mobile phone, so a real-time RF radiation indication is displayed on an android application on the mobile phone.

7. The Mobile RF radiation detection device as claimed in claim 2, comprising wireless connectivity and mobile application whereby mobile radiation is monitored on a mobile display for longer duration and data associated with radiation detection is stored for future analysis.

8. The Mobile RF radiation detection device as claimed in claim 2, wherein said power source comprises integrated battery which supplies power to the flexible sensor and the signal processing unit.

* * * * *